(12) United States Patent
Valverde et al.

(10) Patent No.: US 10,704,314 B2
(45) Date of Patent: Jul. 7, 2020

(54) AUTOMATIC SAFETY WINDOW APPARATUS AND SYSTEM

(71) Applicants: Wilmar Valverde, Seymour, CT (US);
Paul R. Hebert, Manchester, CT (US);
Kevin O'Neill, Branford, CT (US)

(72) Inventors: Wilmar Valverde, Seymour, CT (US);
Paul R. Hebert, Manchester, CT (US);
Kevin O'Neill, Branford, CT (US)

( * ) Notice: Subject to any disclaimer, the term of this patent is extended or adjusted under 35 U.S.C. 154(b) by 194 days.

(21) Appl. No.: 15/911,326

(22) Filed: Mar. 5, 2018

(65) Prior Publication Data

US 2018/0202217 A1  Jul. 19, 2018

Related U.S. Application Data

(63) Continuation-in-part of application No. 15/070,188, filed on Mar. 15, 2016, now abandoned.
(Continued)

(51) Int. Cl.
*E05F 15/72* (2015.01)
*F24F 7/013* (2006.01)
(Continued)

(52) U.S. Cl.
CPC .............. *E05F 15/72* (2015.01); *F24F 7/013* (2013.01); *G08B 21/14* (2013.01); *E05F 15/60* (2015.01);
(Continued)

(58) Field of Classification Search
CPC .......... E05F 15/635; E05F 15/67; E05F 15/72
See application file for complete search history.

(56) References Cited

U.S. PATENT DOCUMENTS

| 4,475,069 A * | 10/1984 | Tadokoro | ................ E05F 15/41 318/264 |
| 4,521,993 A * | 6/1985 | Tacheny | .................. E05F 11/06 49/325 |

(Continued)

FOREIGN PATENT DOCUMENTS

EP    1119837 B1    8/2001

OTHER PUBLICATIONS

Blaine R. Copenheaver, International Search Report and Written Opinion of Int. Searching Authority, PCT/US2017/028712, dated Aug. 25, 2017.

*Primary Examiner* — Catherine A Kelly
(74) *Attorney, Agent, or Firm* — Michael A. Blake

(57) ABSTRACT

An automatic safety window apparatus comprising: an alarm and transmitter unit located remotely from the window unit, the alarm and transmitter unit configured to transmit an open window signal when a threshold level of a gas or smoke is reached and to initiate an alarm; a window unit configured to attach to the interior of a window and face the interior of a room the window is located in, the window unit comprising: a chain actuator, the chain actuator comprising a chain that can exert a pushing force; a fan housing; a control board located in the fan housing, the control board comprising a receiver and a CPU, the CPU in signal communication with the receiver, and CPU in signal communication with the chain actuator, and the receiver in wireless communication with the alarm and transmitter unit, the CPU configured to transmit a signal to the chain actuator to open the window sash when the receiver receives an open window signal from the alarm and transmitter unit; wherein the chain actuator is configured to open the window sash via the chain exerting a pushing force on the window sash.

13 Claims, 13 Drawing Sheets

Related U.S. Application Data

(60) Provisional application No. 62/147,163, filed on Apr. 14, 2015.

(51) Int. Cl.
  G08B 21/14 (2006.01)
  *E05F 15/60* (2015.01)
  *F24F 110/65* (2018.01)
  *F24F 110/72* (2018.01)
  *E05F 15/635* (2015.01)
  *E05F 15/616* (2015.01)

(52) U.S. Cl.
  CPC ........... *E05F 15/616* (2015.01); *E05F 15/635* (2015.01); *E05Y 2201/434* (2013.01); *E05Y 2201/656* (2013.01); *E05Y 2400/45* (2013.01); *E05Y 2400/612* (2013.01); *E05Y 2900/148* (2013.01); *F24F 2110/65* (2018.01); *F24F 2110/72* (2018.01)

(56) References Cited

U.S. PATENT DOCUMENTS

| | | | |
|---|---|---|---|
| 5,019,805 A | 5/1991 | Curl | |
| 5,449,987 A * | 9/1995 | McMillan | G05B 19/042 318/266 |
| 5,595,026 A * | 1/1997 | Licking | E05B 51/02 49/280 |
| 5,605,013 A * | 2/1997 | Hogston | E05F 15/673 49/31 |
| 5,636,579 A * | 6/1997 | Shelley | E05G 7/004 109/11 |
| 5,686,896 A | 11/1997 | Bergman | |
| 5,803,804 A * | 9/1998 | Meier | F24F 11/0001 454/256 |
| 5,896,702 A * | 4/1999 | Wæhrens | E05F 11/06 49/325 |
| 6,019,567 A * | 2/2000 | Lutkus | B60P 1/003 414/501 |
| 6,672,954 B2 * | 1/2004 | Shtanko | B60H 1/00264 454/131 |
| 6,707,173 B2 * | 3/2004 | Bauman | E05F 1/1091 296/146.8 |
| 6,748,700 B1 * | 6/2004 | McAllister | E05D 15/16 49/119 |
| 7,226,111 B2 * | 6/2007 | Berklich, Jr. | B60J 5/101 296/146.4 |
| 8,567,125 B2 * | 10/2013 | Sorensen | E05F 11/06 49/324 |
| 8,669,878 B1 * | 3/2014 | Vantilburg | A62B 5/00 340/632 |
| 8,760,304 B2 * | 6/2014 | Pincu | E05B 65/1033 340/5.64 |
| 8,763,482 B2 * | 7/2014 | Fejer | E05F 11/06 74/89.1 |
| 9,038,317 B2 * | 5/2015 | Hansen | E05F 15/665 49/360 |
| 9,053,626 B2 * | 6/2015 | Cristoforo | G08B 21/14 |
| 9,123,221 B2 | 9/2015 | Puskarich | |
| 9,182,751 B1 * | 11/2015 | Reeder | G01N 33/004 |
| 9,552,711 B2 * | 1/2017 | Peterson | G08B 21/20 |
| 9,811,994 B1 * | 11/2017 | Salzer | G08B 21/14 |
| 10,370,887 B2 * | 8/2019 | Lange | E05D 13/1207 |
| 2006/0002836 A1 * | 1/2006 | Kim | A61L 9/015 423/210 |
| 2006/0170563 A1 | 8/2006 | Stewart | |
| 2007/0169414 A1 * | 7/2007 | Soerensen | E05F 11/06 49/325 |
| 2008/0120913 A1 * | 5/2008 | Lagares Corominas | E05B 65/001 49/449 |
| 2008/0280551 A1 * | 11/2008 | Ashworth | E05F 15/72 454/195 |
| 2009/0139162 A1 * | 6/2009 | Mancini | A62B 13/00 52/204.5 |
| 2014/0266764 A1 | 9/2014 | Vivint | |
| 2016/0321899 A1 * | 11/2016 | Mingo | G08B 17/10 |
| 2017/0051551 A1 * | 2/2017 | Smart | E05D 13/14 |

\* cited by examiner

AUTOMATIC SAFETY WINDOW APPARATUS AND SYSTEM

CROSS-REFERENCES

This patent application is a continuation-in-part of U.S. patent application Ser. No. 15/070,188 by inventors Wilmar Valverde and Paul Hebert entitled "AUTOMATIC SAFETY WINDOW APPARATUS AND SYSTEM," filed on Mar. 15, 2016, and which application is fully incorporated by reference herein. U.S. patent application Ser. No. 15/070,188 claims the benefit of U.S. Provisional Patent Application No. 62/147,163 by inventors Wilmar Valverde and Paul Hebert entitled "SAFETY WINDOW AND OPERATING MECHANISM THEREFORE," filed on Apr. 14, 2015, and which provisional application is fully incorporated by reference herein.

TECHNICAL FIELD

The present invention relates to an automatic safety window apparatus and system and more specifically to an automatic safety window apparatus and system that can detect unsafe levels of gases, and automatically open one or more windows to prevent deadly levels of gases from building up.

BACKGROUND

Many people are killed when unsafe levels of carbon monoxide (CO) and/or natural gas build up in the homes. CO detectors and Natural Gas detectors can detect these gases, but if people are already incapacitated, the audible alarms will do little good. One known disadvantage is that an automatic window opener may cause the window sash to twist, due to the opening pushing on one side of the window sash, thus preventing the window sash from opening.

Thus there is a need for an automatic safety window apparatus and system that overcomes the above listed and other disadvantages.

SUMMARY OF THE INVENTION

The invention relates to an automatic safety window apparatus comprising: an alarm and transmitter unit located remotely from the window unit, the alarm and transmitter unit configured to transmit an open window signal when a threshold level of a gas or smoke is reached and to initiate an alarm; a window unit configured to attach to the interior of a window and face the interior of a room the window is located in, the window unit comprising: a chain actuator, the chain actuator comprising a chain that can exert a pushing force; a fan housing; a control board located in the fan housing, the control board comprising a receiver and a CPU, the CPU in signal communication with the receiver, and CPU in signal communication with the chain actuator, and the receiver in wireless communication with the alarm and transmitter unit, the CPU configured to transmit a signal to the chain actuator to open the window sash when the receiver receives an open window signal from the alarm and transmitter unit; wherein the chain actuator is configured to open the window sash via the chain exerting a pushing force on the window sash.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION OF THE INVENTION

Figure 1:
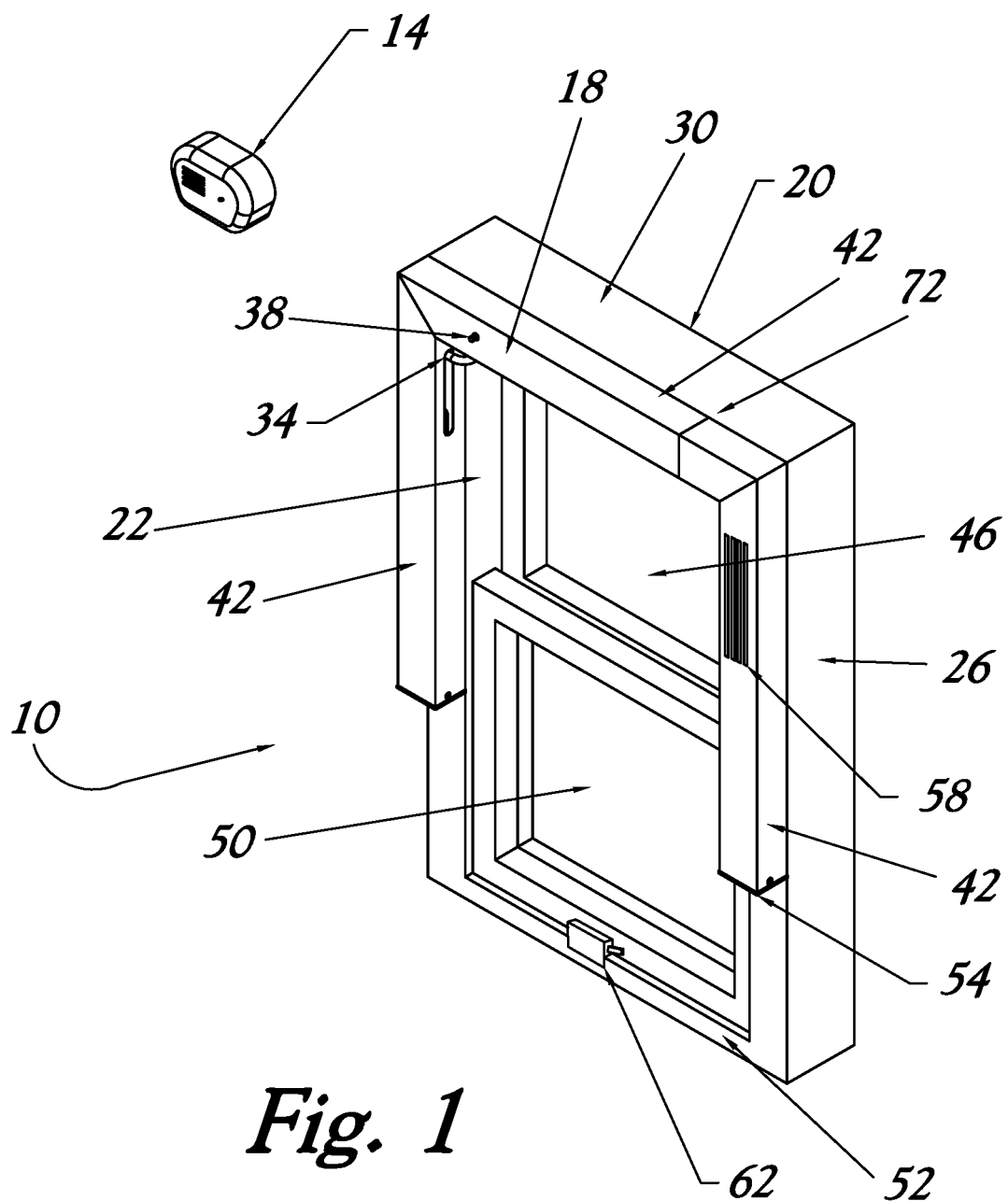
FIG. 1 is a perspective view of the automatic safety window apparatus.

FIG. 1 shows a perspective view of the automatic safety window apparatus 10. The apparatus comprises an alarm and transmitter unit 14. The alarm and transmitter unit 14 may be configured to sound an alarm when it senses a specified level of a particular gas. The gas may be CO or natural gas, or smoke. In addition, when the specified level of gas is sensed, the unit 14 will transmit a signal to the window unit 18. The alarm and transmitter unit 14 may be installed anywhere in the home or building, either on a wall or ceiling. In one embodiment, the alarm and transmitter unit 18 will be located near a source of potentially dangerous gas. The window unit 18 attaches to a window 20. The window 20 may comprise window jams 22, 26, window head 30 (top of window frame); top sash 46, bottom sash 50, and window lock 62 for bottom sash 50, and a window sill 52. The automatic safety window apparatus 10 may be configured to attach to double hung windows such as window 20. However, the automatic safety window apparatus 10 may be configured to attach to any suitable window type. The window unit may attach to one or more of the window jams 22, 26, and/or the window head 30. The window unit 18 comprises a window opening linkage 34 and a reset button 38. The window unit 18 may comprise one more covers 42.

The window unit may have a power connection 54 and an optional air flow vent 58. In addition, the automatic safety window apparatus 10 may also have an adjustable sliding joint 78 in the cover 42. This joint 78 allows the window unit 14 to be adjustable to fit different width windows 20.

Figure 2:
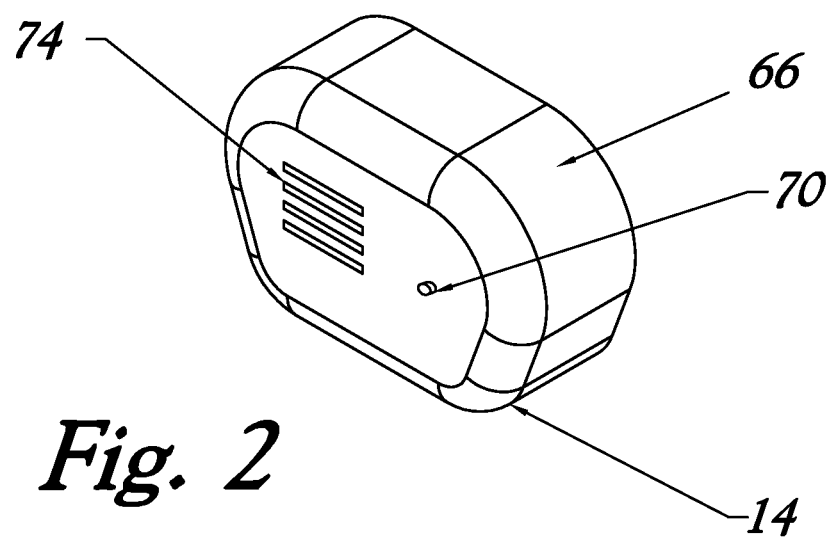
FIG. 2 is a close up perspective view of the alarm and transmitter unit.

FIG. 2 shows a close up perspective view of the alarm and transmitter unit 14. The unit may comprise an alarm and transmitter unit housing 66, an alarm and transmitter unit reset button 70, and an inlet 74 to allow the unit 14 to determine the level of a particular gas or gasses.

Figure 3:
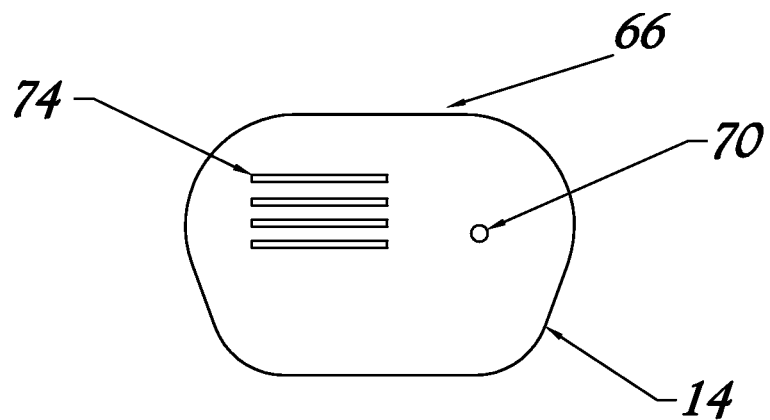
FIG. 3 is a front view of the alarm and transmitter unit from FIG. 2.

FIG. 3 is a front view of the alarm and transmitter unit 14 from FIG. 2. Please note that one of ordinary skill in the art will recognize that in other embodiments, that the alarm and transmitter unit 14 may be incorporated into the window unit 18, so that the window unit 18 is generally a self-contained unit without the need to separately install an alarm and transmitter unit 14.

Figure 4:
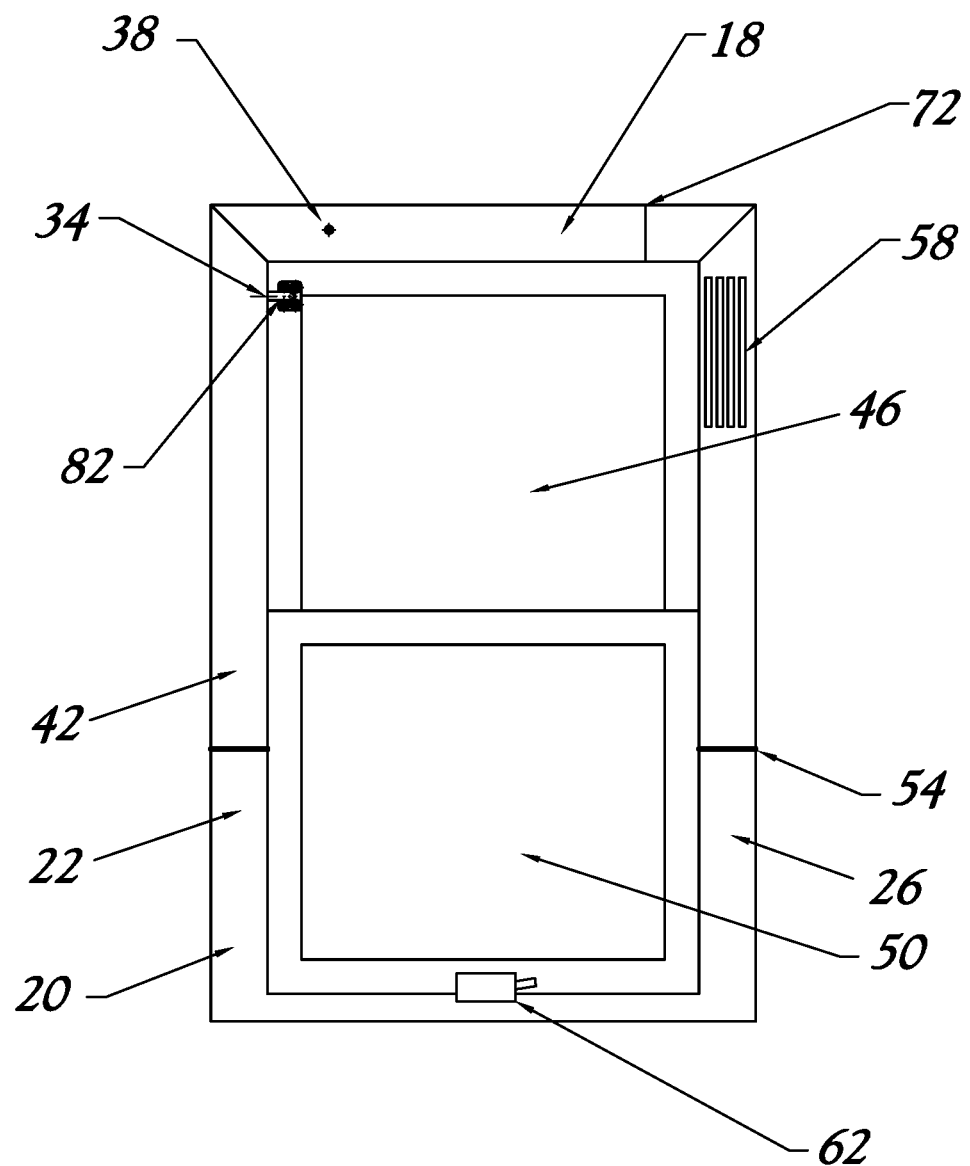
FIG. 4 is a front view of the automatic safety window apparatus.

FIG. 4 is a front view of the automatic safety window apparatus 10 from FIG. 1. In this view, the window sash connector 82 is shown. The window sash connector 82 is in operable communication with window opening linkage 34. The sash connector 82 is attached to the top sash 46 in this embodiment.

Figure 5:
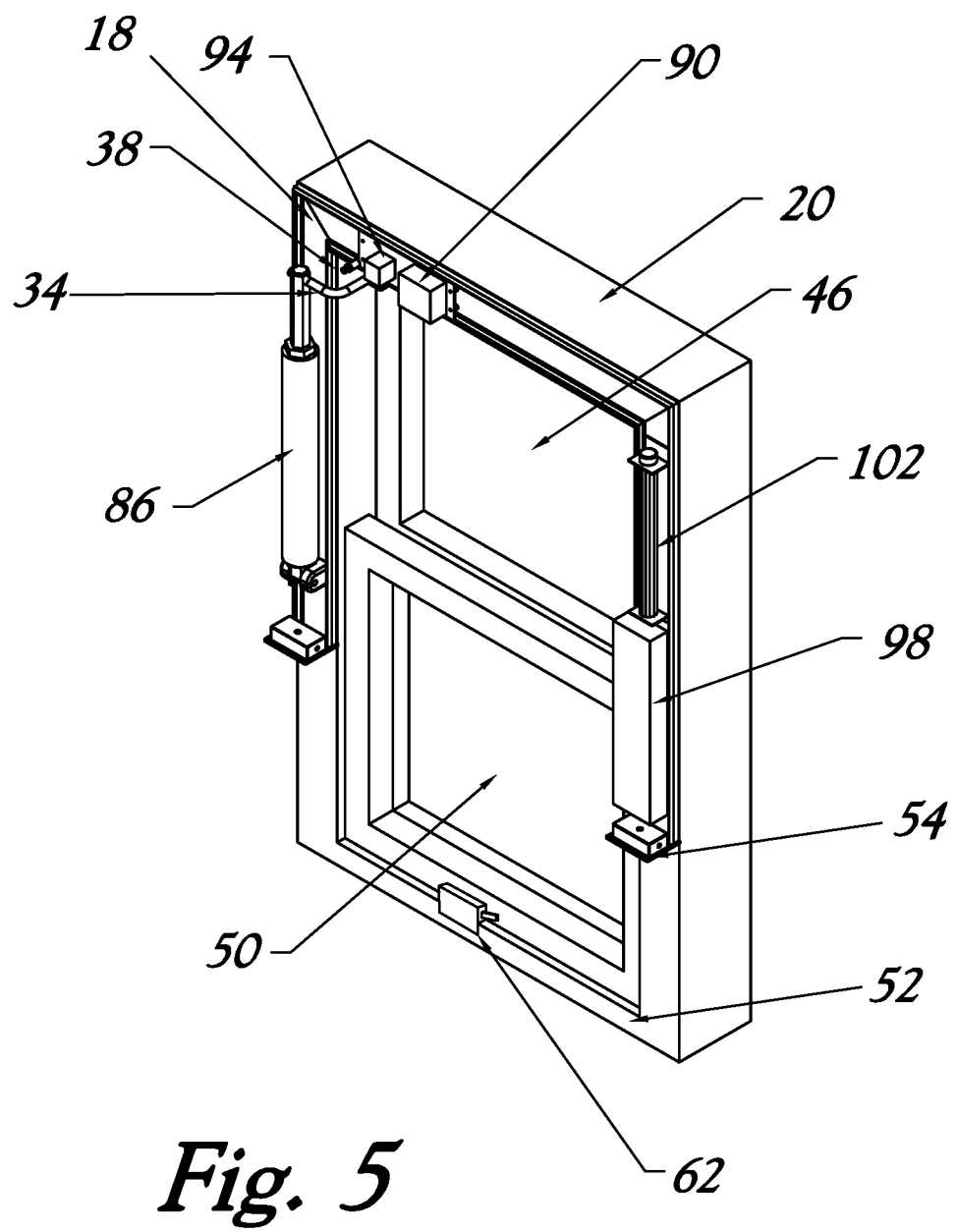
FIG. 5 is a perspective view of the automatic safety window apparatus with the covers removed.

FIG. 5 is a perspective view of the automatic safety window apparatus 10 with the covers 42 removed. In this view an actuator 86, which comprises the automatic safety window apparatus 10 is shown. The actuator may be any suitable device that provides linear movement, including and not limited to an electric cylinder. The actuator 86 is configured to move the linkage 34, window sash connector 82, and the top sash 46. Thus, the actuator 86 can open the window 20 (by lowering the top sash 46 in one embodiment) to prevent a deadly accumulation of deadly gases or smoke. Also comprising the automatic safety window apparatus 10 is a receiver 90 and solid state relay 94 configured to activate the actuator 86. The receiver 90 is in signal communication with the alarm and transmitter unit 14. In some embodiments, the alarm and transmitter unit 18 may be configured to be in signal communication with two or more receivers 90 in two or more window units 18. In one embodiment the receiver 90 is in wireless communication with the alarm and transmitter unit 14, but in other embodiments they may be in wired communication. Thus, when the alarm and transmitter unit 14 detects an unsafe level of gas, the alarm goes off in the unit 14, and a signal is sent from the unit 14 to the receiver 90, which in turn communicates with the relay 94 which activates the actuator 86 which lowers the top sash 46. An optional power supply 98 is shown in communication with the actuator 86, relate 94, and recover 90. The power supply may be a battery, either rechargeable, or replaceable battery after a length of time. In other embodiments, the window unit 18 may be powered via the power connection 54 to an electrical line. The window unit 18 may also comprise a fan 102 in electrical communication with the power supply 98 or the power connection 54. The fan 102 may be any suitable fan, including and not limited to a vertical cross-flow fan. The fan 102 may be configured to pull outside air into the room where the window unit 18 is located via the open window. In other embodiments, the fan 102 may be configured to take air out of the room where the window unit 18 is located and direct the room air to the outdoors via the open window.

Figure 6:
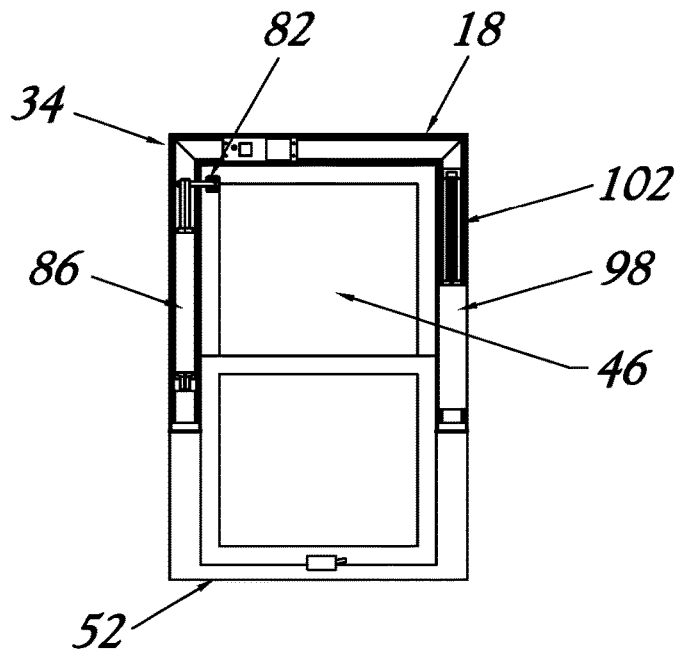
FIG. 6 is a front view of the automatic safety window apparatus from FIG. 5.

FIG. 6 shows a front view of the window unit 18 with the covers 42 removed. In this figure, the top sash 46 is in a closed position.

Figure 7:
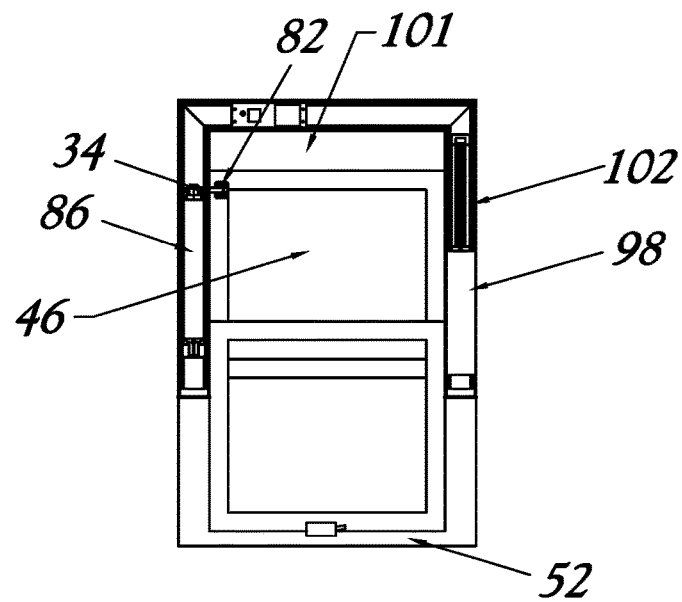
FIG. 7 is a front view of the automatic safety window apparatus with the top sash opened.

FIG. 7 shows a front view of the window unit 18 with the covers 42 removed. In this figure, the top sash is in an opened position with an opening 106 made by the lowering of the top sash 46 by the actuator 86, linkage 34 and sash connector 82.

Figure 8:
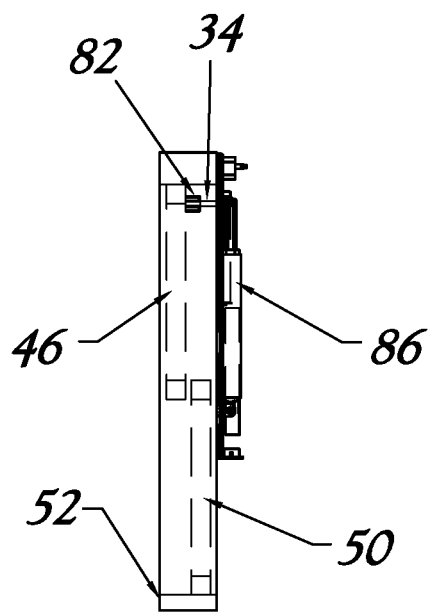
FIG. 8 side view of the automatic safety window apparatus.

FIG. 8 shows a side view cutaway view of the window 20 and window unit 18. In this view the top sash 46 is closed.

Figure 9:
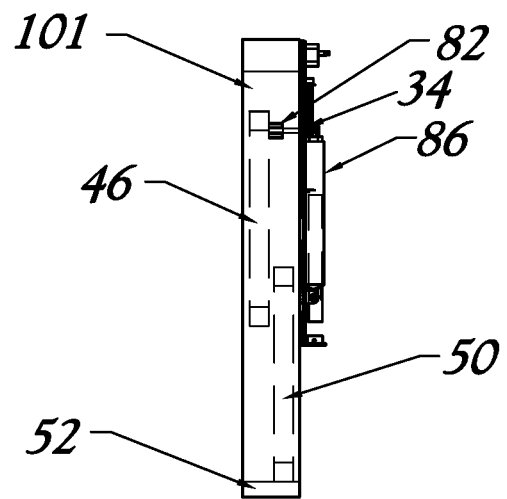
FIG. 9 is a side view of the automatic safety window apparatus with the top sash opened.

FIG. 9 shows a side view cutaway view of the window 20 and window unit 18. In this view the top sash 46 is opened, showing an opening 102 in the window 20 to let clean outside air into the room.

In another embodiment, a chain actuator may be used to open the window. The chain in a chain actuator can both push and pull with the chain. One chain actuator that may be used is the SYNCHRO QUASAR chain actuator supplied by Automated Fenestration Inc., 12833 Simms Ave., Hawthorne, Calif. 90250. The chain actuator may be modified from the existing 24 VDC to 12 VDC and the push/pull power will be around 400 N.

Figure 10:
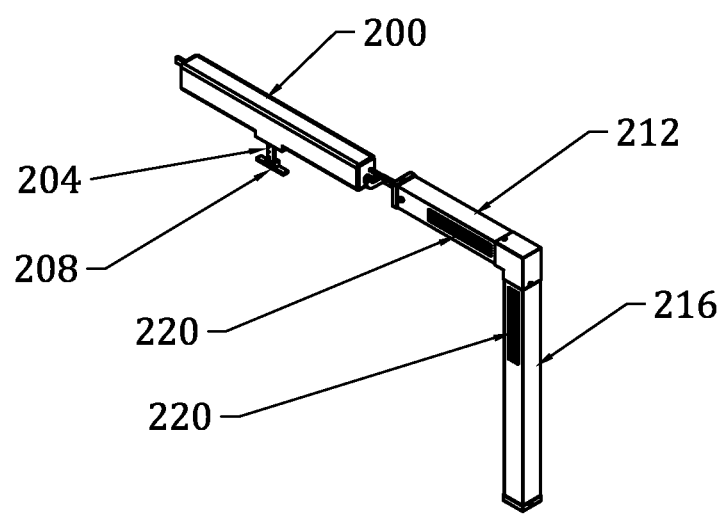
FIG. 10 is a perspective view of the window unit showing a chain actuator.

FIG. 10 is a perspective view of the window unit showing the chain actuator 200 with a chain 204 extending from the actuator 200. Attached to one end of the chain 204 is a window sash connector 208. The window sash connector 208 connects to a window sash, thus allowing the chain actuator 200 to open the window sash. A first fan housing 212 and a second fan housing 216 are also part of the window unit. Inside the second fan housing 216 will be a control board and battery pack. The control board will have a CPU and a receiver in signal communication with each other. The housings 212, 216 each have air vents 220. Optionally the device may be hardwired into the building electric supply.

Figure 11:
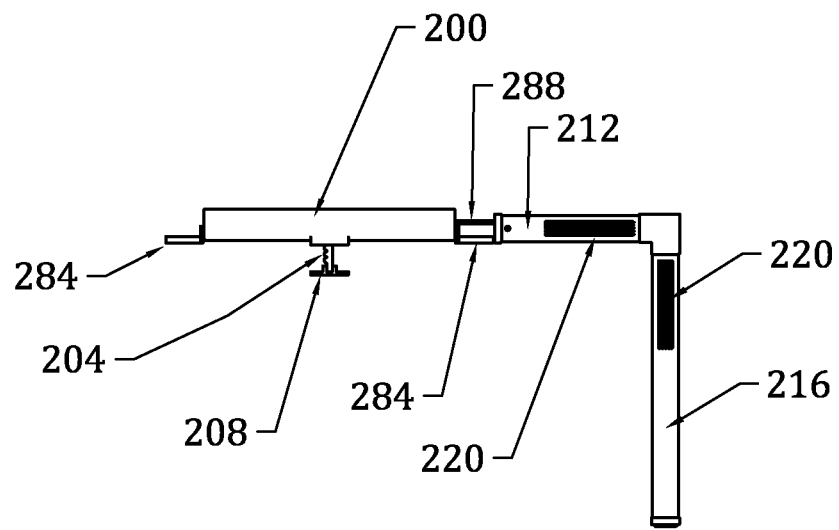
FIG. 11 is a front view of the window unit from FIG. 10.

FIG. 11 is a front view of the window unit from FIG. 10. In this view one can see the window frame brackets 284 extending form the chain actuator 200 that may be used to attach the chain actuator to the window frame. In addition, a wire connector 288 connects the chain actuator ultimately to the CPU. The wire connector 288 is generally flexible, and has enough length to allow one to configure the chain actuator 200 closer or farther from the fan housing 212, so that the window unit can fit various sized windows. Thus, the chain actuator 200 can be configured to be adjustably positioned with respect to the fan housing from abutting the fan housing to about 2 feet away from the fan housing, thus allowing the window unit to be installed a variety of sized windows.

Figure 12:
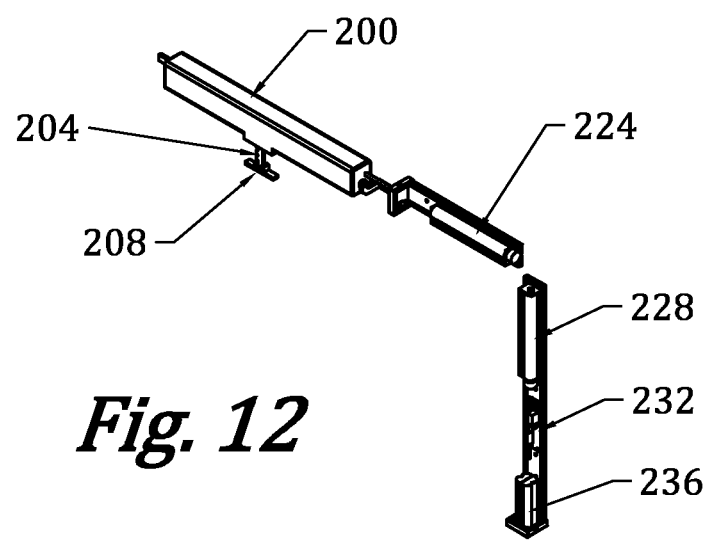
FIG. 12 is a perspective view of the window unit from FIG. 10, with the fan housings removed.

FIG. 12 is a perspective view of the window unit from FIG. 10, with the fan housings 212 and 216 removed. In this view the vertical cross-flow fans 224, 228 are visible, as is the control board 232 and battery 236.

Figure 13:
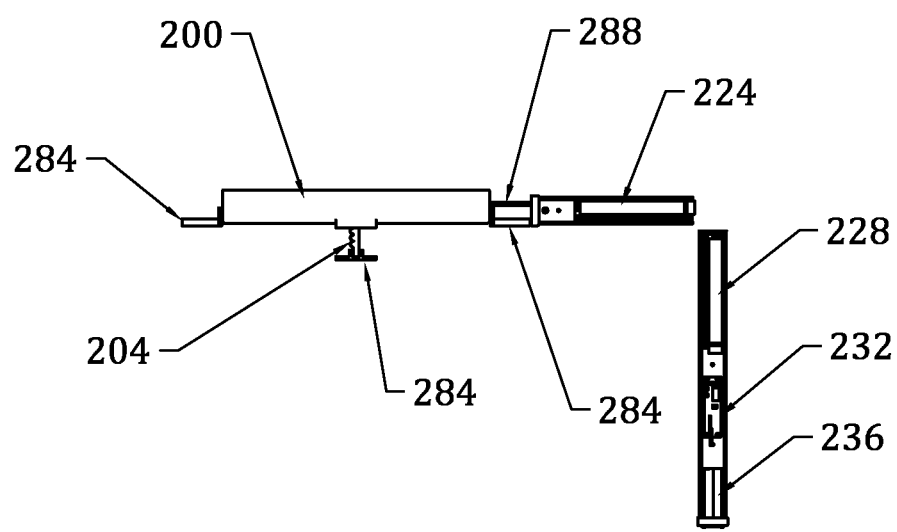
FIG. 13 is a front view of the window unit from FIG. 12.

FIG. 13 is a front view of the window unit from FIG. 12.

Figure 14:
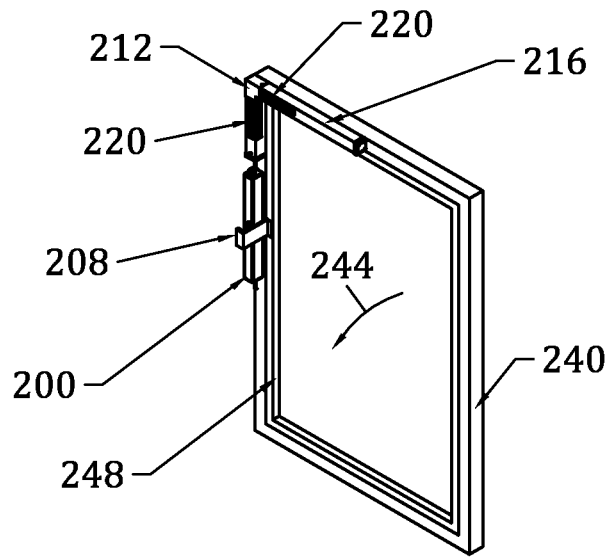
FIG. 14 is a perspective view of the window unit installed on inward swing casement window.

FIG. 14 is a perspective view of the window unit installed on inward swing casement window 240. In this embodiment, the chain actuator pushes the window open in the direction shown by the arrow 244. The chain 204 may be attached to a window sash connector 208. In this embodiment, the chain 204 pushes the window sash connector 208 and the window sash 248 opened by applying a pushing force against the window sash connector 208.

Figure 15:
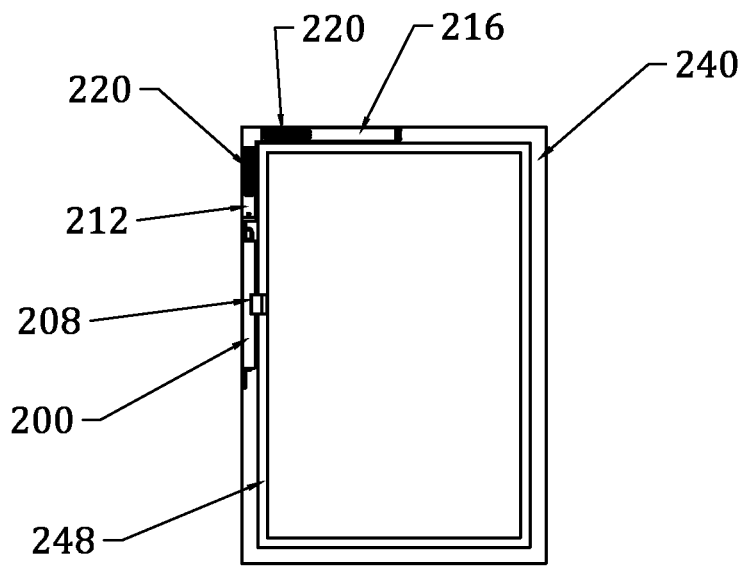
FIG. 15 is a front view of the window unit attached to the casement window.

FIG. 15 is a front view of the window unit attached to the casement window 240.

Figure 16:
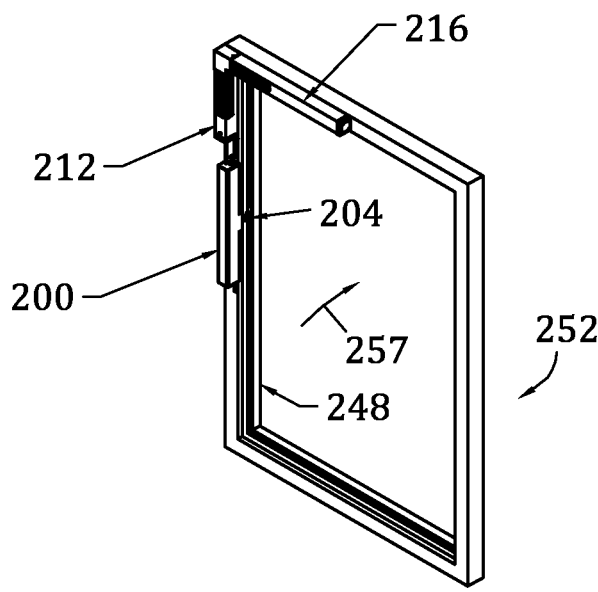
FIG. 16 is a perspective view of the window unit installed on outward swing casement window.

FIG. 16 is a perspective view of the window unit installed on outward swing casement window 252. In this embodiment, the chain actuator pushes the window open in the direction shown by the arrow 257. The chain 204 may be attached to a window sash connector or attached directly to the window sash 248, as shown in this embodiment. In this embodiment, the chain 204 pushes the window sash 248 opened by applying a pushing force against the window sash 248.

Figure 17:
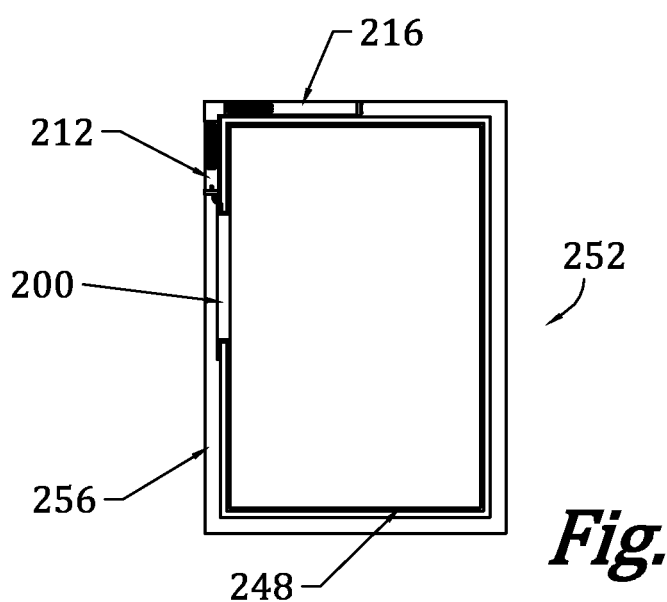
FIG. 17 is front view of the window unit from FIG. 16.

FIG. 17 is front view of the window unit from FIG. 16. IN this view, one can see that the actuator 200 is offset from the first fan housing 212. The actuator may be attached to the interior of the window frame 256 that is the portion of the window frame that faces an opposite interior surface of the same window frame 256, as contrasted with the surface of the window frame that faces the interior of the room. This positioning of the actuator 200 simply allows the chain to directly push the window sash 248 opened.

Figure 18:
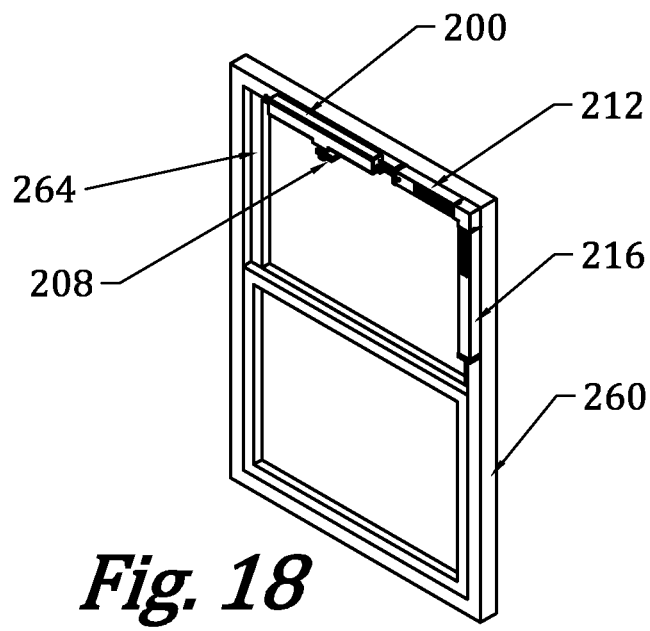
FIG. 18 is a perspective view of the window unit installed on double hung window.

FIG. 18 is a perspective view of the window unit installed on double hung window 260. Attached to one end of the chain 204 is a window sash connector 208. The window sash connector 208 connects to a window sash 264, thus allowing the chain actuator 200 to open the window sash 264 by pushing down on the window sash connector 208.

Figure 19:
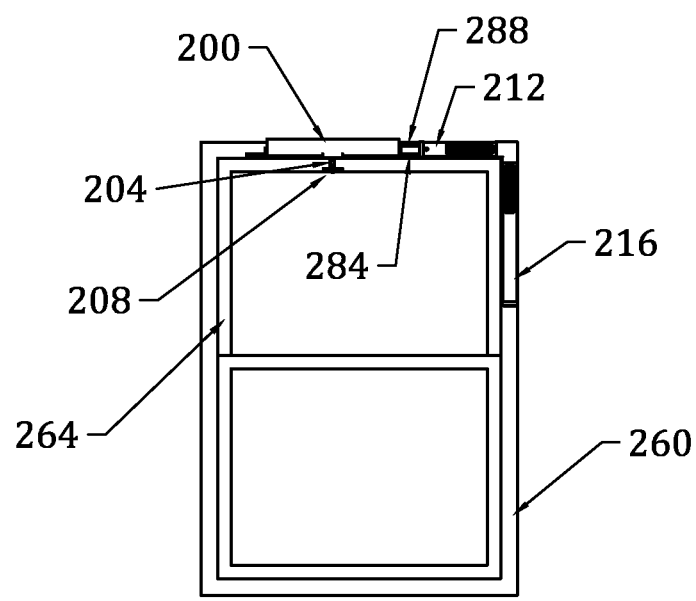
FIG. 19 is a front view of the window unit from FIG. 18.

FIG. 19 is a front view of the window unit from FIG. 18.

Figure 20:
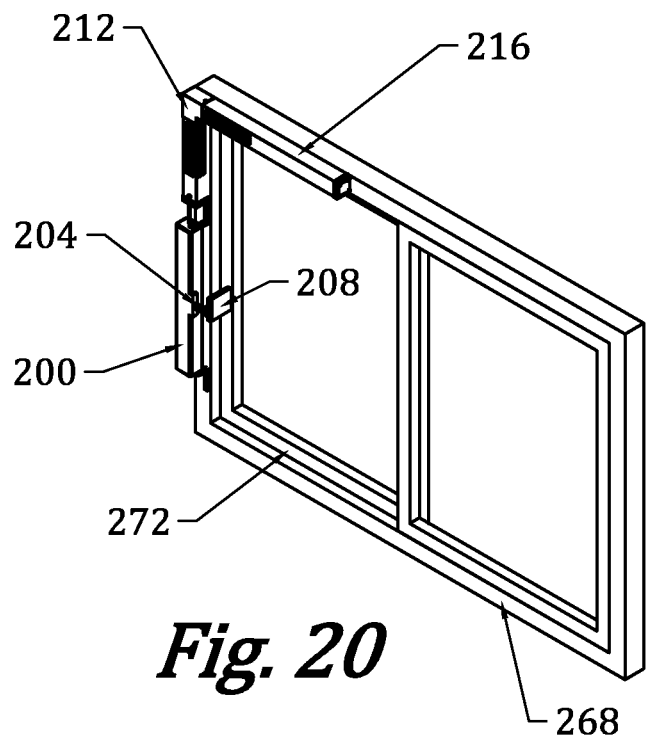
FIG. 20 is a perspective view of the window unit installed on sliding window.

FIG. 20 is a perspective view of the window unit installed on sliding window 268. Attached to one end of the chain 204 is a window sash connector 208. The window sash connector 208 connects to a window sash 272, thus allowing the chain actuator 200 to open the window sash 272 by pushing up on the window sash connector 208.

Figure 21:
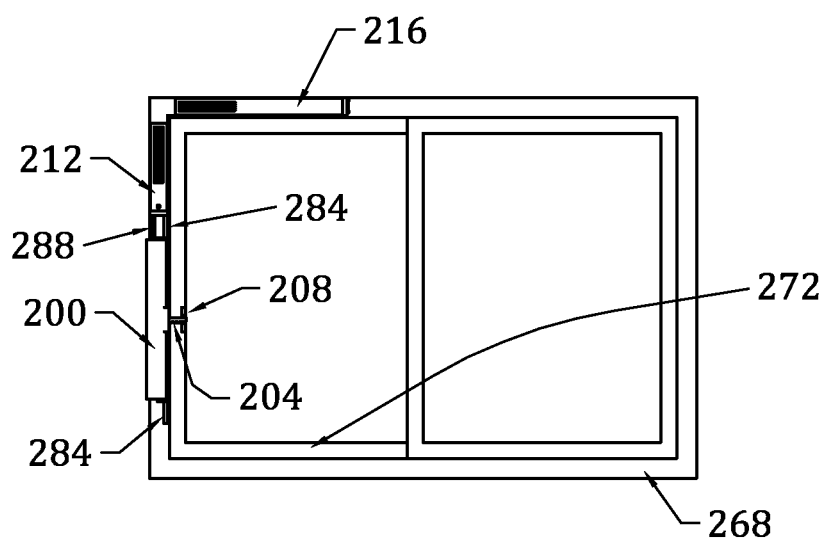
FIG. 21 is a front view of the window unit from FIG. 20.

FIG. 21 is a front view of the window unit from FIG. 20.

Figure 22:
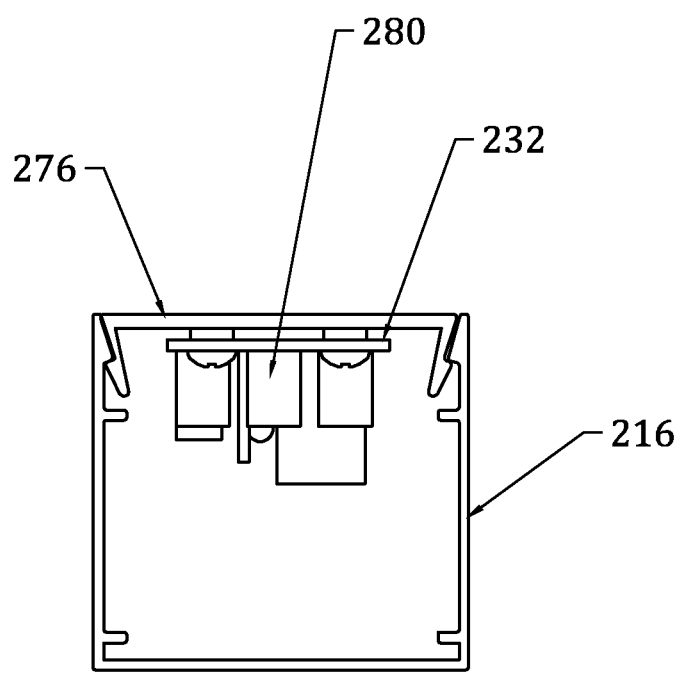
FIG. 22 is a top view cross-sectional view of the fan housing.

FIG. 22 is a top view cross-sectional view of the fan housing 216 that houses the control board 232. The control board 232 comprises a receiver 280. The housing 216 comprises a back plate 276. The housing 216 and back plate 276 may be made out of a material that allows transmission of radio waves, such as plastic. In other embodiments, the back plate 276 may be made out of a metal material, since the receiver 280 will generally be receiving radio signals through the walls of the housing 216 (excluding the back plate 276). The portion of the fan housing not including the back plate 276 may be called the front section.

In one embodiment, the automatic safety window apparatus, and system may be attached to the interior of an existing window frame that operates wirelessly with CO and/or Natural Gas alarms. When the alarm is activated a signal may be sent from the alarm to a receiver in the window unit and then that triggers an electric cylinder to drop the upper window pane about 4 inches to about 6 inches. This allows the evacuation of the gases from the room, in one embodiment a bedroom or a plurality of bedrooms. A drop of 1000 to 2000 particles per million may allow a person to survive and leave the building. The size of the building and location of the gas sources will determine the location and number of alarms and window units required. The alarm may activate at 275 ppm and the window would open. Based on testing on this invention, the parts per million never exceeded 275 ppm. A remote main power supply with a backup battery to power up to 4 windows and alarms may be supplied. A lot of these types of gas leaks or CO accidents happen when there is a loss of power in the building, so the backup battery may be a an important part of this system. There is also an optional fan built into the frame to aid in evacuating the air through the window opening. This system can also be integrated in the window frame as a self-contained unit for new window installation or as an interior surface applied unit and these same systems and also be adapted to commercial casement windows for schools, offices and apartment buildings.

In one experimental test, the exhaust of a car with a V8 engine was connected to a chamber, the chamber was meant to represent a bedroom. 440 Particles per Million (ppm) of CO was exiting at the exhaust pipe of the car. The chamber size was 10'×10'×7'9". The temperature in chamber was 62° F. at the beginning of the test. The room had 4 ppm of CO before the car was running. The alarm activated when an index gauge read 272 ppm, and a window was open about 4 inches. The chamber never reaches higher than 272 ppm. Three consecutive tests were run with the internal ppm triggering the alarm from 247 to 272 ppm. The ppm within the room on all 3 tests dropped to 200 ppm in 20 minutes and to 129 ppm in 30 minutes. Gage reading outside window when the alarm activated and the window opened 4 inches went from 151 ppm to 40 ppm in 13 minutes without an exhaust fans. Volume of air exiting the window was between 53 and 125 cubic feet per minute. For the 4th test, air fans were added blowing inward into the chamber. The room temperature was 68°; it dropped from 220 ppm upon opening the window to 115 ppm in 15 minutes.

This invention has many advantages. It automatically opens a room window when a threshold level of gas is detected, thereby saving the life of whoever is the room, and allowing that person to escape the room. The invention may have a rechargeable battery to power the device, thus in the event of a power failure the device will still work. The invention may have a remote alarm and transmitter unit that may be located near a gas source, in order to provide early detection of unsafe gas levels, and early opening of the window. The invention may be attached to almost any residential or commercial window in an aftermarket fashion. The invention not only provides an alarm, but will provide proactive action, and open a window in a person's bedroom. The invention can monitor the building twenty-four hours a day, seven days a week, whether or not someone is in the building or not, and open the windows if required. The chain actuator embodiment allows the chain actuator to be positioned with respect to the window sash it is opening so that any twisting of the window sash is prevented or minimized, so that window sash can be easily opened. Further, the chain actuator embodiment is easily installed, as no cutting is required, the chain actuator and fan housing units are easily installed on a variety of sizes of windows and types of windows, including double hung, sliders, inward swinging casement windows, and outward swinging casement windows, among others.

The control board may comprise a processing system. The processing system may include, but is not limited to a computer system including central processing unit (CPU), display, storage and the like. The computer system may include, but not be limited to, a processor(s), computer(s), controller(s), memory, storage, register(s), timing, interrupt (s), communication interface(s), and input/output signal interfaces, and the like, as well as combinations comprising at least one of the foregoing. For example, the computer system may include signal input/output for controlling and receiving signals from the alarm and transmitter unit.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. An automatic safety window apparatus comprising:
an alarm and transmitter unit located remotely from the window unit, the alarm and transmitter unit configured to transmit an open window signal when a threshold level of a gas or smoke is reached and to initiate an alarm;
a window unit configured to attach to the interior of a window and face the interior of a room the window is located in, the window unit comprising:
an actuator;
a fan housing located inside the room, wherein the actuator is configured to be adjustably positioned with respect to the fan housing from about abutting the fan housing to about 2 feet away from the fan housing;
a first fan located in the fan housing;
a second fan located in the fan housing;
a control board located in the fan housing, the control board comprising a receiver and a CPU, the CPU in signal communication with the receiver, the CPU in signal communication with the actuator, the CPU in signal communication with the first fan, the CPU in signal communication with the second fan, and the receiver in wireless communication with the alarm and transmitter unit and does not have a wired connection with the alarm and transmitter unit, the CPU configured to transmit a signal to the actuator to open the window sash when the receiver receives the open window signal from the alarm and transmitter unit;
wherein the actuator is configured to open the window sash via the exerting a pushing force on the window sash, and first fan and the second fan are configured to blow air from outside of the room through the window, into the room, and the automatic safety window apparatus is configured to reduce the ppm of the carbon monoxide in the room to less than about 110 ppm.

2. The automatic safety window apparatus of claim 1, wherein the transmitter and receiver are in direct wireless communication.

3. The automatic safety window apparatus of claim 1, wherein the transmitter and receiver communicate directly with each other without going through a computer network, internet, private computer network, intranet.

4. The automatic safety window apparatus of claim 1, wherein the gas threshold level is a threshold level of carbon monoxide.

5. The automatic safety window apparatus of claim 1, wherein the gas threshold level is a threshold level of natural gas.

6. The automatic safety window apparatus of claim 1, wherein the window unit further comprises:
a battery power source in communication with the control board and the actuator.

7. The automatic safety window apparatus of claim 6, wherein the battery power source is rechargeable.

8. The automatic safety window apparatus of claim 1, wherein the window unit has a power connection in electrical communication with the control board and the actuator and configured to connect to a building's power source.

9. The automatic safety window apparatus of claim 1, wherein the first fan is a vertical cross-flow fan.

10. The automatic safety window apparatus of claim 1 wherein the window unit is configurable to open a double hung window, a slider window, an inward swing casement window, an outward swing casement window.

11. The automatic safety window apparatus of claim 1 wherein the fan housing is made out of a plastic that allows transmission of radio signals.

12. The automatic safety window apparatus of claim 1 wherein the fan housing comprises a back plate, and a front section, wherein the front section is made out of a plastic that allows transmission of radio signals.

13. The automatic safety window apparatus of claim 12, wherein the back plate is made out of metal or plastic.

* * * * *